(12) United States Patent
Barnat

(10) Patent No.: US 7,213,446 B2
(45) Date of Patent: May 8, 2007

(54) METHOD OF SELECTING A BITUMINOUS EMULSION BASED ON ITS COALESCENCE

(75) Inventor: James Barnat, Wichita, KS (US)

(73) Assignee: SemMaterials, L.P., Tulsa, OK (US)

( * ) Notice: Subject to any disclaimer, the term of this patent is extended or adjusted under 35 U.S.C. 154(b) by 442 days.

(21) Appl. No.: 10/928,569

(22) Filed: Aug. 27, 2004

(65) Prior Publication Data

US 2006/0047008 A1    Mar. 2, 2006

(51) Int. Cl.
*G01N 11/00*    (2006.01)
(52) U.S. Cl. .................. 73/53.01; 106/277; 106/31.25
(58) Field of Classification Search ............... 73/64.56, 73/53.01; 106/277, 31.25; 525/59–70
See application file for complete search history.

(56) References Cited

U.S. PATENT DOCUMENTS

| | | | |
|---|---|---|---|
| 4,576,648 A | | 3/1986 | Demangeon et al. |
| 4,772,648 A | | 9/1988 | Demangeon et al. |
| 4,978,698 A | * | 12/1990 | Woodhams .................. 524/62 |
| 5,494,966 A | * | 2/1996 | Hesp et al. ................. 525/54.5 |
| 5,626,658 A | | 5/1997 | McArdle |
| 5,705,564 A | * | 1/1998 | Liang et al. ............... 525/54.5 |
| 5,708,061 A | * | 1/1998 | Hesp et al. .................. 524/59 |
| 5,987,969 A | * | 11/1999 | Joseph et al. ............. 73/53.01 |
| 6,048,905 A | | 4/2000 | Asamori et al. |
| 7,150,996 B2 | * | 12/2006 | Nicoli et al. ................. 436/69 |

2002/0129737 A1    9/2002    Deneuvillers

FOREIGN PATENT DOCUMENTS

GB           869530        5/1961

OTHER PUBLICATIONS

EPAf Premanufacture Notice p. 1-16, Document Control No. 51010000186-188. Available 2002.

\* cited by examiner

*Primary Examiner*—Hezron Williams
*Assistant Examiner*—Rodney Frank
(74) *Attorney, Agent, or Firm*—Molly D. McKay

(57) ABSTRACT

A method of selecting a bituminous emulsion with enhanced performance for paving is provided. This method includes selecting polymer modified bitumen with a penetration value of about 25 to 450 dmm at 25° C. and selecting one or more emulsifiers comprised of at least about 5% by mass of a cationic nitrogenous compound selected from compounds having a carbonyl carbon atom bonded to a nitrogen atom, compounds having a carbon atom double bonded to a nitrogen atom, or combinations thereof based on the total mass of the selected emulsifier. Each selected emulsifier is reacted with a carboxylic acid to create one or more carboxylate salts. Each carboxylate salt created from a different proposed emulsifier separately is mixed with the bitumen to form one or more proposed bituminous emulsions. The coalescence of each proposed bituminous emulsion is measured using a rheology test, and a bituminous emulsion of the composition described above is chosen for paving a surface based on its coalescence properties.

28 Claims, No Drawings

METHOD OF SELECTING A BITUMINOUS EMULSION BASED ON ITS COALESCENCE

CROSS-REFERENCE TO RELATED APPLICATIONS

Not Applicable.

STATEMENT REGARDING FEDERALLY SPONSORED RESEARCH OR DEVELOPMENT

Not applicable.

BACKGROUND OF THE INVENTION

Current chipsealing processes involve applying a film of rapid setting asphalt emulsion to a roadway surface to seal cracks and imperfections. This is followed by applying a single layer of aggregate onto the emulsion to provide a riding surface. Typically, extra aggregate is not swept away immediately but remains on the road for at least one night to allow sufficient time for the bitumen to harden. Traffic is released to the new surface before the excess aggregate is swept away thus creating a high potential for vehicles being damaged from the loose aggregate.

Typical chipseal formulations utilized today include blends of tallow polyamines as emulsifiers. A major component of the blend is usually a tallow diamine. Typically, hydrochloric acid is added to the emulsifier to form a hydrochloride salt.

U.S. Pat. No. 4,576,648 (the '648 patent) suggests the use of cationic emulsifiers and a carboxylic acid. More specifically, the '648 patent discusses imidazoles and other cationic nitrogenous compounds as valuable to improving the long-term aging properties of a bituminous emulsion after the emulsion has broken. This is evidenced by the '648 patent's discussion of improving the aging properties of the binder and verifying this using an artificial aging Rolling Thin Film Oven test (RTFO test), which causes the emulsion being tested to break. The '648 patent provides no suggestion as to how to optimize the formulation of a bituminous emulsion to improve its short-term properties, such as coalescence. In fact, the '648 patent teaches away from the present invention by stating that aliphatic amines or fatty amines are particularly suitable cationic emulsifying agents.

In order to overcome the disadvantages of current paving processes, a method of selecting a better bituminous emulsion for a paving process is provided. This method includes performance testing a bituminous emulsion before selecting it for a paving process.

BRIEF SUMMARY OF THE INVENTION

It is an object of the present invention to provide a more systematic way to select a bituminous emulsion so that emulsions with acceptable coalescence behavior can be chosen consistently.

The foregoing and other objects are achieved by the method of the present invention for selecting a bituminous emulsion with enhanced performance. This method includes selecting a bitumen with a penetration value of about 25 to 450 dmm at 25° C. Thereafter, one or more proposed emulsifiers are selected for evaluation. The proposed emulsifiers selected for evaluation can be comprised of a single chemical compound or a mixture of two or more chemical compounds. The proposed emulsifier should contain a cationic nitrogenous compound that is selected from compounds having a carbonyl carbon atom bonded to a nitrogen atom, compounds having a carbon atom double bonded to a nitrogen atom or combinations thereof. The cationic nitrogenous compound should be at least 5% by mass of the total mass of the proposed emulsifier. The emulsifier is reacted with a carboxylic acid to create one or more carboxylate salts. Each carboxylate salt created from a different proposed emulsifier separately is mixed with the bitumen to form one or more proposed bituminous emulsions. The coalescence of each proposed bituminous emulsion is measured using a rheology or other coalescence test, and a bituminous emulsion made from an emulsifier of the composition described above and a carboxylic acid is chosen for paving a surface based on its coalescence properties.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

DETAILED DESCRIPTION OF PREFERRED EMBODIMENT

The present invention involves formulating and selecting a bituminous emulsion with enhanced performance for paving. Preferably, the method of the present invention is used to select a bituminous emulsion for a chipsealing process. This method involves coalescence performance testing one or more bituminous emulsions obtained from a select group of emulsions that are formulated from a cationic nitrogenous compound and a carboxylic acid.

More specifically, this method involves creating at least one proposed bituminous emulsion, measuring the coalescence of each proposed bituminous emulsion, and selecting a bituminous emulsion for paving a surface based on its coalescence properties. Preferably, multiple proposed bituminous emulsions are created and performance tested so as to have a wider variety of specimens from which to choose an optimal bituminous emulsion for paving a surface.

The proposed bituminous emulsion is created from bitumen, water, emulsifier and acid. One or more proposed emulsifiers is selected for evaluation. The proposed emulsifiers selected for evaluation can be comprised of a single chemical compound or a mixture of two or more chemical compounds. The proposed emulsifiers should contain a cationic nitrogenous compound that is selected from compounds having a carbonyl carbon atom bonded to a nitrogen atom, compounds having a carbon atom double bonded to a nitrogen atom, or combinations thereof. The cationic nitrogenous compound should be at least 5% by mass of the total mass of the proposed emulsifier. This proposed emulsifier is reacted with a carboxylic acid to form a proposed carboxylate salt. The proposed carboxylate salt is a reversible salt. The proposed carboxylate salt is mixed with bitumen to form a proposed bituminous emulsion to be tested for coalescence behavior.

Preferably, the emulsifier includes at least about 10% by mass of the cationic nitrogenous compound described above based on the total mass of the emulsifier. Most preferably, the emulsifier includes at least about 20% by mass of the cationic nitrogenous compound described above based on the total mass of the emulsifier. Examples of appropriate cationic nitrogenous compounds include imidoamines, imines, amidoamines, amides, imadazoles, and combinations thereof. If imadazoles are selected, then preferably the imadazole used is an imidazolene. The terms amides, amidoamines, imidoamines, and imidazolenes, should be construed broadly to include, respectively, polyamides, polyamidoamines, polyimidoamines, and poly-imidazolenes.

A carboxylic acid that is able to react with the emulsifier and protonate it should be used. Preferably, this carboxylic acid is selected from mono, di-, and tricarboxylic acids or combinations thereof. Most preferably, the carboxylic acid includes acetic acid, formic acid, propionic acid, or combinations thereof.

Preferably, the bitumen is polymer modified and has a penetration value of about 25 to 450 decimillimeters (dmm) at 25° C.

The emulsifier and the acid are mixed together to form an aqueous solution containing carboxylate salts. They are mixed together in an approximately stoichiometric ratio. An optimal target pH for the mixture is chosen based on the acid selected. This target pH is determined by experimentation. Typically, the aqueous solution should have a pH of about 1–6. Preferably, the aqueous solution's pH is about 2–5. Most preferably, its pH is about 3.5–4 for typical carboxylic acids.

Preferably, the bitumen is heated until it is sufficiently fluid before it is mixed with the aqueous solution. The aqueous solution is then mixed with the bitumen to form an emulsion. Preferably, a high shear mill, static mixing device or other apparatus where the bitumen is in a dispersed phase is used in this mixing step. Preferably, the average size of the dispersed phase is between about 0.8 and 50 microns. Preferably, the emulsion created has a residue of about 35 to 85% based on the weight of the emulsion.

The coalescence of the proposed bituminous emulsions is measured using a rheology or other coalescence test (i.e., demulsability or sand-break index). Preferably, when multiple proposed bituminous emulsions are created according to the steps outlined above, coalescence measurements of multiple proposed emulsions can be obtained. Preferably, coalescence is measured using a test that involves moving the bituminous layer (formed by placing bituminous emulsion and aggregate on a surface) and measuring its resistance to flow. Most preferably, this is done using a rheology test. Many appropriate rheology tests revolve around measuring shear, torque, or tension. Other appropriate tests impart different stresses due to impact or abrasion. Any of a number of rheology tests may be used to measure the coalescence of the bituminous emulsion.

Examples of desirable rheology tests include, but are not limited to, an abrasion test, a tangential shear test, an impact test, a tensile test, a torque test, a compression test, an adhesion test, or a binder viscosity test. Preferably, the rheology test is a vialit test or a sweep test. Most preferably, the rheology test is a sweep test. More specifically, it is most preferred to follow Sweep Test ASTM-D7000-04, which determines the strength of the bitumen as a function of time. This test involves physically abrading the surface of a specimen to assess the strength of the bituminous layer. In the sweep test, mass loss is a failure of the system. The better a product performs, the lower the mass loss. When compared with a control, a reduction in mass loss is favorable while increased mass loss denotes deteriorated performance. Throughout this application the control used for comparison purposes in determining reductions and increases in mass loss was a hydrochloride salt control (formulated from hydrochloric acid and a fatty amine). Lower mass losses on this test correlate with bitumen that is harder or more cured. Most preferably, the sweep test is performed after the specimen is cured at 35° C. for 1 hour. The emulsifier concentration may affect sweep test results. An increase or decrease of the emulsifier concentration is sometimes warranted to optimize sweep test performance.

The coalescence should be measured within about 48 hours of when the proposed bituminous emulsion is applied. Preferably, coalescence is measured within about 24 hours of when the proposed bituminous emulsion is applied. Most preferably, the coalescence is measured within about 12 hours of when the proposed bituminous emulsion is applied. The precise amount of time in which coalescence is measured should depend upon the paving materials and paving techniques being used. For instance, it is most preferred to test the coalescence of a chipsealing composition, which sets rapidly, within less than an hour of when it is applied. Preferably, coalescence of the proposed bituminous emulsion is measured before it is applied to a roadway, such as in a laboratory setting.

If a sweep test is performed, it is desirable to select a bituminous emulsion that is able to create an aggregate/bitumen system having a sweep test mass loss that is reduced by at least about 10% at 1 hour compared to a bituminous emulsion hydrochloride salt control formulated from hydrochloric acid and a nitrogenous emulsifier that does not have a carbonyl carbon atom bonded to a nitrogen atom or a carbon atom double bonded to a nitrogen atom. Preferably, the system has a sweep test mass loss that is reduced by at least about 20% at 1 hour. Most preferably, the system has a sweep test mass loss that is reduced by at least about 30% at 1 hour.

After performing the steps outlined above, a bituminous emulsion for paving a surface is selected by choosing one of the proposed bituminous emulsions that has desirable coalescence properties. If none of the proposed emulsions demonstrate desirable coalescence, then one or more additional bituminous emulsions should be formulated following the method described above. The amount of cationic nitrogenous compound in the proposed emulsifier should be increased and/or the amount of emulsifier in the bituminous emulsion should be changed in the new formulations. Alternatively, the carboxylic acid used to protonate the emulsifier mixture should be changed. These new proposed emulsions should be performance tested using a coalescence test. Then, a bituminous emulsion for paving a surface can be chosen from the new formulations based on the coalescence data. In this way, this method can be performed as an iterative process.

The current invention focuses on the coalescence of the emulsion, which is usually complete within 48 hours, rather than long-term aging properties. A bituminous emulsion with good and predictable coalescence properties can be selected by following the method outlined above. Both emulsion stability and performance can be optimized with the method of the present invention.

The following examples illustrate the effects of different acids and emulsifiers on bituminous emulsion coalescence properties. The Sweep Test—ASTM D 7000-04 was chosen to establish this performance property.

For all of the examples below, a 50/50 blend by weight of bitumen from Conoco (PG 58-28) and Husky (85/100 penetration) was selected. This bitumen also was modified with 3% by weight of a styrene/butadiene (SB) polymer that was cross-linked.

A fatty amine derivative blend, namely, Redicote E-4819 from Akzo Nobel, was chosen as a control because it is an industry standard emulsifier for cationic rapid set bituminous emulsions. By definition, a fatty amine has no carbonyl carbon attached to at least one nitrogen group available for protonation and has no carbon atom double bonded to a nitrogen atom.

The emulsifier was reacted with hydrochloric acid, which is the standard acid used in the industry for these types of emulsions, to form an aqueous solution containing a hydrochloride salt. The aqueous solution was then mixed with the bitumen to create an emulsion. The emulsifier concentration of the hydrochloride salt control was optimized and held constant at 0.22% by weight emulsion. The emulsifier concentration for the carboxylate salts ranged from 0.18% through 0.26% by weight emulsion.

The emulsifier also was reacted with acetic acid and formic acid, as set forth in Table 1 below, to create carboxylic acid systems for proton donation for comparison purposes. These acids formed the carboxylate salts of Redicote E-4819. Acid was added to the water slowly while stirring. Then, the emulsifier was added to the aqueous acid solution and mixed for 15 minutes. The pH was checked and adjusted as necessary to keep the aqueous carboxylate salt solution pH between 3.5 and 4. The emulsifier/acid reaction was carried out at temperatures between 50 and 60° C. The emulsifier concentration for the carboxylate salts ranged from 0.18% through 0.26% by weight emulsion.

The bituminous material was heated to 135–145° C. The temperatures of the hydrochloride salt and carboxylate salt aqueous solutions were adjusted to 35° C. Separately, each solution was injected into a high shear bituminous emulsion mill to create an emulsion. All the emulsions discussed above were created with 100% fatty amine emulsifier and thus are outside the scope of the present invention. The emulsions were collected and stored in an oven overnight at 60° C.

The Sweep Test was chosen as the performance test for the coalescence and subsequent hardening of the bituminous emulsions. Each emulsion was tested in duplicate or triplicate with a series of aggregates. The results are shown below in Table 1:

TABLE 1

% Sweep Test Mass Loss Reduction (increase) Over 1 Hour

Conoco PG 58-28, Husky PG 85/100 — Aggregate minerology

| Emulsifier | Acid | Solution pH | Emusifier Chemical Conc. | Quartzite | High carbonate limestone | Medium carbonate limestone | Granite |
|---|---|---|---|---|---|---|---|
| E-4819 | Acetic | 4.0 | 0.18% | (73) | (173) | (121) | (160) |
| E-4819 | Acetic | 4.0 | 0.22% | (18) | (113) | (129) | (70) |
| E-4819 | Acetic | 4.0 | 0.26% | (27) | (133) | (86) | (70) |
| E-4819 | Formic | 3.5 | 0.18% | (191) | (40) | (36) | (160) |
| E-4819 | Formic | 3.5 | 0.22% | (100) | (80) | (36) | (50) |
| E-4819 | Formic | 3.5 | 0.26% | (73) | (87) | (57) | (20) |

The performance data displayed in Table 1 was calculated relative to the performance data for the hydrochloride salt control. Table 1 clearly demonstrates the superior performance of the hydrochloride salt verses the carboxylate salts when a fatty amine emulsifier is used. There was a universal increase in mass loss for all carboxylate salts over a wide range of fatty amine emulsifier concentrations. The use of carboxylic acids to donate protons hurts the performance of nitrogenous emulsifiers that do not contain a compound with a carbonyl carbon atom bonded to a nitrogen atom or a carbon atom double bonded to a nitrogen atom. This performance data displays the negative consequences of using carboxylic acids as proton donors with traditional bituminous emulsion systems, such as those made from fatty amines.

The method of the present invention is illustrated by the following examples. These examples are not meant in any way to limit the scope of this invention.

EXAMPLE 1

A SHRP PG 58-22 from Conoco Denver was chosen as the base bitumen. It was modified with a cross-linked styrene-butadiene block co-polymer in concentrated form and diluted to a total polymer concentration of 3% based on the weight of the bitumen.

An imidazolene, namely, Varine O from Witco, was chosen as the cationic nitrogenous emulsifier for a series of experiments. It was used in a fixed chemical concentration of 0.40% by weight emulsion.

Formic and acetic acids were used to form the respective carboxylate salts. Hydrochloride salts were used as a control for comparative purposes.

Experiment A. Formic acid was added to water at room temperature. Varine O was added and was mixed with the aqueous acid solution for 15 minutes. The pH of the formate salt solution was adjusted to 3.5.

Experiment B. Acetic acid was added to water at room temperature. Varine O was added and was mixed with the aqueous acid solution for 15 minutes. The pH of the acetate salt solution was adjusted to 4.0.

Control 1. Hydrochloric acid was added to water at room temperature. Varine O was added and was mixed with the aqueous acid solution for 15 minutes. The pH of the hydrochloride salt solution was adjusted to 2.0.

The bitumen was heated to 135 to 145° C., and the aqueous phases were heated to 35° C. The bituminous material and each aqueous phase from experiment A, B and Control 1 were independently injected into a high shear Dalworth lab scale mill and emulsified. The proportions were approximately 70% bituminous material and 30% aqueous material by weight.

A proof test was executed to verify performance of the bituminous emulsion. The Sweep Test ASTM D 7000-04 was chosen. Samples were produced per the ASTM procedure. A cure temperature of 35° C. was chosen along with 1 hour for the cure time. The results are displayed below in Table 2, relative to the hydrochloride salt control:

TABLE 2

% Sweep Test Mass Loss Over 1 Hour
Conoco PG 58-28 bitumen with 3% crosslinked SBS
Aggregate: Quartzite - New Ulm, MN

| Experiment | Proton Donor | Optimal pH | Mass Loss Reduction |
|---|---|---|---|
| A | Formic acid | 3.5 | 78% |
| B | Acetic acid | 4.0 | 44% |

The acetate salt provided decreased mass loss of 44% at 1 hour while the formate salt reduced the mass loss by 78% at 1 hour. This example illustrates that the coalescence of the emulsion has been greatly improved by following the method of the present invention.

EXAMPLE 2

A SHRP PG 58-22 from Conoco Denver was chosen as the base bitumen. It was identical to the bituminous material used in Example 1.

A fatty amidoamine with a generic formulation of $R(CONHRNH_2)_3$, namely, Indulin MQK-1M from Meade-Westvaco, was chosen as the cationic nitrogenous emulsifier for Experiments C, D and Control 2. A fixed emulsifier concentration was established at 0.40% by weight emulsion for the hydrochloride and carboxylate salts.

Formic and acetic acids were used to form the respective carboxylate salts. Hydrochloride salts were used as a control for comparative purposes.

Experiment C. Formic acid was added to water at room temperature. Indulin MQK-1M was added and was mixed with the aqueous acid solution for 15 minutes. The pH of the formate salt solution was adjusted to 3.5.

Experiment D. Acetic acid was added to water at room temperature. Indulin MQK-1M was added and was mixed with the aqueous acid solution for 15 minutes. The pH of the acetate salt solution was adjusted to 4.0.

Control 2. Hydrochloric acid was added to water at room temperature. Indulin MQK-1M was added and was mixed with the aqueous acid solution for 15 minutes. The pH of the hydrochloride salt solution was adjusted to 2.0.

The bitumen was heated to 135 to 145° C., and the aqueous phases were heated to 35° C. The bituminous material and each aqueous phase from experiment C, D, and Control 2 were injected into a high shear Dalworth lab scale mill and emulsified. The proportions were approximately 70% bituminous material and 30% aqueous material by weight.

A proof test was executed to verify performance of the bituminous emulsion. The Sweep Test ASTM D 7000-04 was chosen. Samples were produced per the ASTM procedure. A cure temperature of 35° C. was chosen along with 1 hour for the cure time. The results are displayed below in Table 3, relative to the hydrochloride salt control:

TABLE 3

% Sweep Test Mass Loss Over 1 Hour
Conoco PG 58-28 bitumen with 3% crosslinked SBS
Aggregate: Quartzite - New Ulm,

| Experiment | Proton Donor | Optimal pH | Mass Loss Reduction |
|---|---|---|---|
| C | Formic acid | 3.5 | 87% |
| D | Acetic acid | 4.0 | 93% |

The amidoamines demonstrate similar trends to the imidazolenes in Example 1. The carboxylate salts reduced the sweep test mass loss by an astonishing 87% and 93% for the formate and acetate salts, respectively, at 1 hour.

EXAMPLE 3

A SHRP PG 58-22 from Conoco Denver was chosen as the base bitumen. It was identical to the bituminous material used in Examples 1 and 2.

A fatty amine emulsifier, namely, Redicote E-4819 and an imidazolene emulsifier, namely, Varine O, were selected. Four blends of these emulsifiers were produced ranging from 0% imidazolene/100% fatty amine through 50% imidazolene/50% fatty amine based on the weight of the unsalted emulsifier. The 0% imidazolene/100% fatty amine emulsifier falls outside the scope of the current invention, whereas the 10%/90%, 25%/75%, and 50%/50% mixtures represent embodiments of the current invention.

Formic and acetic acids were used to form the respective carboxylate salts within the scope of the present invention. Hydrochloride salts were used as a control for comparative purposes.

Experiment E. Acetic acid was added to water heated to between 50 and 60° C. Redicote E-4819 was added at a concentration to yield 0.22% by weight emulsion. No emulsifier blend within the scope of the current invention was used. It was mixed for 15 minutes. The acetate salt solution was adjusted for optimal performance to pH 4.0. The experiment control was produced in similar fashion except hydrochloric acid was substituted for the acetic acid, and the optimal pH was 2.0.

Experiment F. Acetic acid was added to water heated to between 50 and 60° C. Varine O was added to provide 10% by weight of the total emulsifier added, and Redicote E-4819 was added to provide the additional 90%. The total emulsifier concentration was 0.22% by weight emulsion. It was mixed for 15 minutes. The pH of the acetate salt solution was adjusted to 4.0.

Experiment G. Acetic acid was added to water heated to between 50 and 60° C. Varine O was added to provide 25% by weight of the total emulsifier added and Redicote E-4819 was added to provide the additional 75%. The total emulsifier concentration was 0.22% by weight emulsion. The contents were mixed for 15 minutes. The pH of the acetate salt solution was adjusted to 4.0.

Experiment H. Acetic acid was added to water heated to between 50 and 60° C. Varine O was added to provide 50% by weight of the total emulsifier added and Redicote E-4819 was added to provide the additional 50%. The total emulsifier concentration was 0.22% by weight emulsion. The contents were mixed for 15 minutes. The pH of the acetate salt solution was adjusted to 4.0.

The bitumen of step 1 was heated to 135 to 145° C. and the aqueous phases were cooled to 35° C. The bituminous material and each aqueous phase from experiments E, F, G and H were independently injected into a high shear Dalworth lab scale mill and emulsified. The proportions were approximately 70% bituminous material and 30% aqueous material by weight.

A proof test was executed to verify performance of the bituminous emulsion. The Sweep Test ASTM D 7000-04 was chosen. Samples were produced per the ASTM procedure. A cure temperature of 35° C. was chosen along with 1 hour for the cure time. The results are displayed below in Table 4, relative to the hydrochloride salt control:

TABLE 4

% Sweep Test Mass Loss Over 1 Hour
Conoco PG 58-28 bitumen with 3% crosslinked SBS
Aggregate: Quartzite - New Ulm,

| Experiment | % Imidazolene | % Fatty Amine | Mass Loss Reduction (Incr.) |
|---|---|---|---|
| E | 0% | 100% | (16) |
| F | 10% | 90% | 34 |
| G | 25% | 75% | 42 |
| H | 50% | 50% | 50 |

The data clearly shows the use of the carboxylate amine salts hurts the performance of a bituminous emulsion during the curing and hardening stage. In particular, the mass loss increased by 16% when only a fatty amine blend was used as the emulsifier. The addition of a small amount of select group cationic nitrogenous emulsifiers drastically reduces the sweep test mass loss. A substitution of 10% of the total emulsifier with an imidazole is more than sufficient to impact the performance properties.

From the foregoing it will be seen that this invention is one well adapted to attain all ends and objectives hereinabove set forth, together with the other advantages which are obvious and which are inherent to the invention.

Since many possible embodiments may be made of the invention without departing from the scope thereof, it is to be understood that all matters herein set forth are to be interpreted as illustrative, and not in a limiting sense.

While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

I claim:

1. A method of selecting a bituminous emulsion with enhanced performance, comprising:
   (a) selecting at least one proposed emulsifier comprised of at least about 5% by mass of a cationic nitrogenous compound selected from the group consisting of compounds having a carbonyl carbon atom bonded to a nitrogen atom, compounds having a carbon atom double bonded to a nitrogen atom, and combinations thereof based on the total mass of said proposed emulsifier;
   (b) reacting said proposed emulsifier with a carboxylic acid to create at least one proposed carboxylate salt;
   (c) mixing bitumen and said proposed carboxylate salt to form at least one proposed bituminous emulsion;
   (d) applying said proposed bituminous emulsion to a surface;
   (e) measuring coalescence of said proposed bituminous emulsion; and
   (f) selecting a bituminous emulsion for paving a surface after said coalescence measuring step and choosing said bituminous emulsion based on said coalescence measurement of said proposed bituminous emulsion.

2. The method of claim 1 wherein said bitumen has a penetration value of about 25 to 450 dmm at 25° C.

3. The method of claim 1 wherein said proposed bituminous emulsion has a residue of about 35 to 85% based on the weight of the emulsion.

4. The method of claim 1 wherein said bitumen is polymer modified.

5. The method of claim 1 wherein said cationic nitrogenous compound is selected from the group consisting of imidoamines, imines, amidoamines, amides, imadazoles, and combinations thereof.

6. The method of claim 1 wherein coalescence is measured using is a rheology test.

7. The method of claim 1 wherein coalescence is directly measured.

8. The method of claim 7 wherein coalescence is measured using a demulsibility test.

9. The method of claim 7 wherein coalescence is measured using a sand-break index test.

10. The method of claim 1 wherein coalescence is measured within about 48 hours of when said bituminous emulsion is applied to said surface.

11. The method of claim 1 wherein coalescence is measured within about 24 hours of when said bituminous emulsion is applied to said surface.

12. The method of claim 1 wherein coalescence is measured within about 12 hours of when said bituminous emulsion is applied to said surface.

13. The method of claim 1 wherein said proposed emulsifier is comprised of at least about 10% by mass of said cationic nitrogenous compound based on the total mass of said emulsifier.

14. The method of claim 1 wherein said proposed emulsifier is comprised of at least about 20% by mass of said cationic nitrogenous compound based on the total mass of said emulsifier.

15. The method of claim 1, further comprising:
   reformulating said proposed bituminous emulsion by repeating steps (a)–(e) if the coalescence of said proposed bituminous emulsion is undesirable, before performing step (f).

16. The method of claim 15 wherein said reformulating step includes increasing the amount of said cationic nitrogenous compound in said proposed emulsifier.

17. The method of claim 15 wherein said reformulating step includes selecting a different carboxylic acid.

18. The method of claim 6 wherein said rheology test is selected from the group consisting of an abrasion test, a tangential sheer test, an impact test, a tensile test, a torque test, a compression test, an adhesion test and a binder viscosity test.

19. The method of claim 18 wherein said rheology test is a sweep test.

20. The method of claim 18 wherein said rheology test is a vialit test.

21. The method of claim 18 wherein said rheology test is a tensile test.

22. The method of claim 1 wherein said carboxylic acid is selected from the group consisting of mono, di- and tricarboxylic acids and combinations thereof.

23. The method of claim 1 wherein said carboxylic acid is selected from the group consisting of acetic acid, formic acid, propionic acid and combinations thereof.

24. The method of claim 1 wherein said carboxylic acid is acetic acid.

25. The method of claim 19 wherein said selected bituminous emulsion has a mass loss from said sweep test that is reduced by at least about 10% at 1 hour compared with a bituminous emulsion hydrochloride salt control.

26. The method of claim 19 wherein said selected bituminous emulsion has a mass loss from said sweep test that is reduced by at least about 20% at 1 hour compared with a bituminous emulsion hydrochloride salt control.

27. The method of claim 19 wherein said selected bituminous emulsion has a mass loss from said sweep test that is reduced by at least about 30% at 1 hour compared with a bituminous emulsion hydrochloride salt control.

28. A method of selecting a bituminous emulsion with enhanced performance, comprising:
    (a) selecting at least one proposed emulsifier comprised of at least about 5% by mass of a cationic nitrogenous compound selected from the group consisting of compounds having a carbonyl carbon atom bonded to a nitrogen atom, compounds having a carbon atom double bonded to a nitrogen atom, and combinations thereof based on the total mass of said proposed emulsifier;
    (b) reacting said proposed emulsifier with a carboxylic acid selected from the group consisting of acetic acid, formic acid, propionic acid and combinations thereof to create at least one proposed carboxylate salt;
    (c) mixing bitumen and said proposed carboxylate salt to form at least one proposed bituminous emulsion;
    (d) applying said proposed bituminous emulsion to a surface;
    (e) measuring coalescence of said proposed bituminous emulsion using a rheology test within about 48 hours of when said proposed bituminous emulsion is applied to said surface; and
    (f) selecting a bituminous emulsion for paving a surface after said coalescence measuring step and choosing said bituminous emulsion based on said coalescence measurement of said proposed bituminous emulsion.

* * * * *

UNITED STATES PATENT AND TRADEMARK OFFICE
CERTIFICATE OF CORRECTION

| | | |
|---|---|---|
| PATENT NO. | : 7,213,446 B2 | Page 1 of 1 |
| APPLICATION NO. | : 10/928569 | |
| DATED | : May 8, 2007 | |
| INVENTOR(S) | : James Barnat | |

It is certified that error appears in the above-identified patent and that said Letters Patent is hereby corrected as shown below:

Col. 10, in claim 6, the second appearance of the word "is" should be deleted.

Signed and Sealed this

Third Day of July, 2007

JON W. DUDAS
*Director of the United States Patent and Trademark Office*